(12) United States Patent
Chang

(10) Patent No.: US 6,427,296 B1
(45) Date of Patent: Aug. 6, 2002

(54) COUPLING DEVICE

(76) Inventor: Vincent Chang, 58, Ma Yuan West St., Taichung (TW)

( * ) Notice: Subject to any disclaimer, the term of this patent is extended or adjusted under 35 U.S.C. 154(b) by 0 days.

(21) Appl. No.: 09/863,991

(22) Filed: May 21, 2001

(51) Int. Cl.[7] ............................. A44B 13/12; B66C 1/36
(52) U.S. Cl. .................... 24/601.4; 24/601.2; 24/600.9; 24/371; 24/580
(58) Field of Search ............................ 24/601.4, 601.2, 24/600.9, 580, 543, 371; 224/269

(56) References Cited

U.S. PATENT DOCUMENTS

| 62,194 | A | * | 2/1867 | Hayden | 24/601.4 |
|---|---|---|---|---|---|
| 504,039 | A | * | 8/1893 | Kempshall | 24/601.4 |
| 3,354,522 | A | * | 11/1967 | Amon | 24/600.9 |
| 5,832,572 | A | * | 11/1998 | Norrby | 24/600.9 |
| 5,913,479 | A | * | 6/1999 | Westwood, III | 24/600.9 |

FOREIGN PATENT DOCUMENTS

| GB | 0128412 | * | 6/1919 | 24/600.9 |
|---|---|---|---|---|
| GB | 0136230 | * | 12/1919 | 24/600.9 |

* cited by examiner

*Primary Examiner*—Victor Sakran

(57) ABSTRACT

A coupling device has a shackle, a hook connected to the shackle, and a safety clamp device surrounding the shackle. The safety clamp device has a central reinforced rib, a flap bar, a slot, a plurality of clamp teeth, and a flexible plate. The flexible plate has a curved portion and a guide recess. The flap bar is inserted in the slot of the safety clamp device.

2 Claims, 8 Drawing Sheets

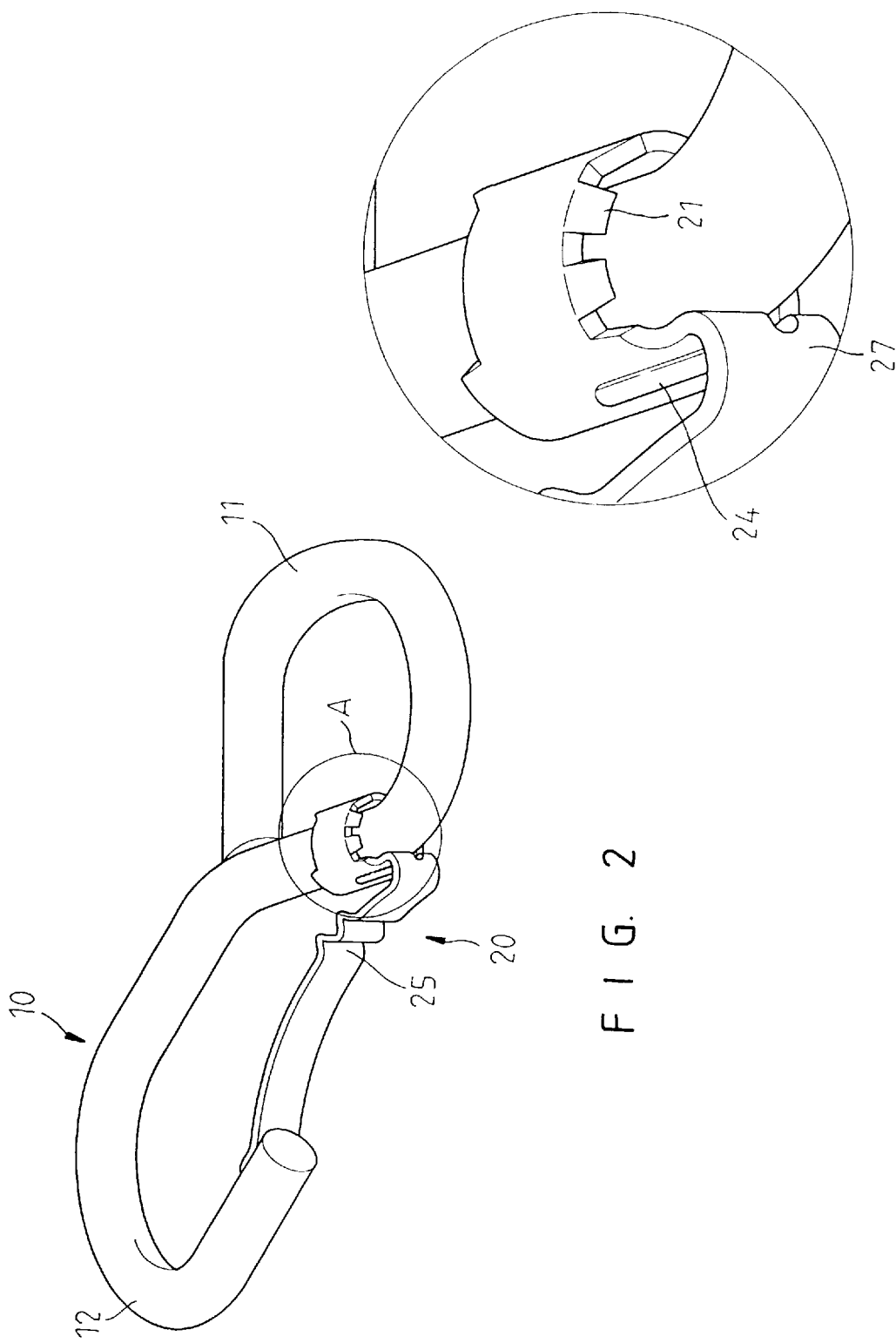

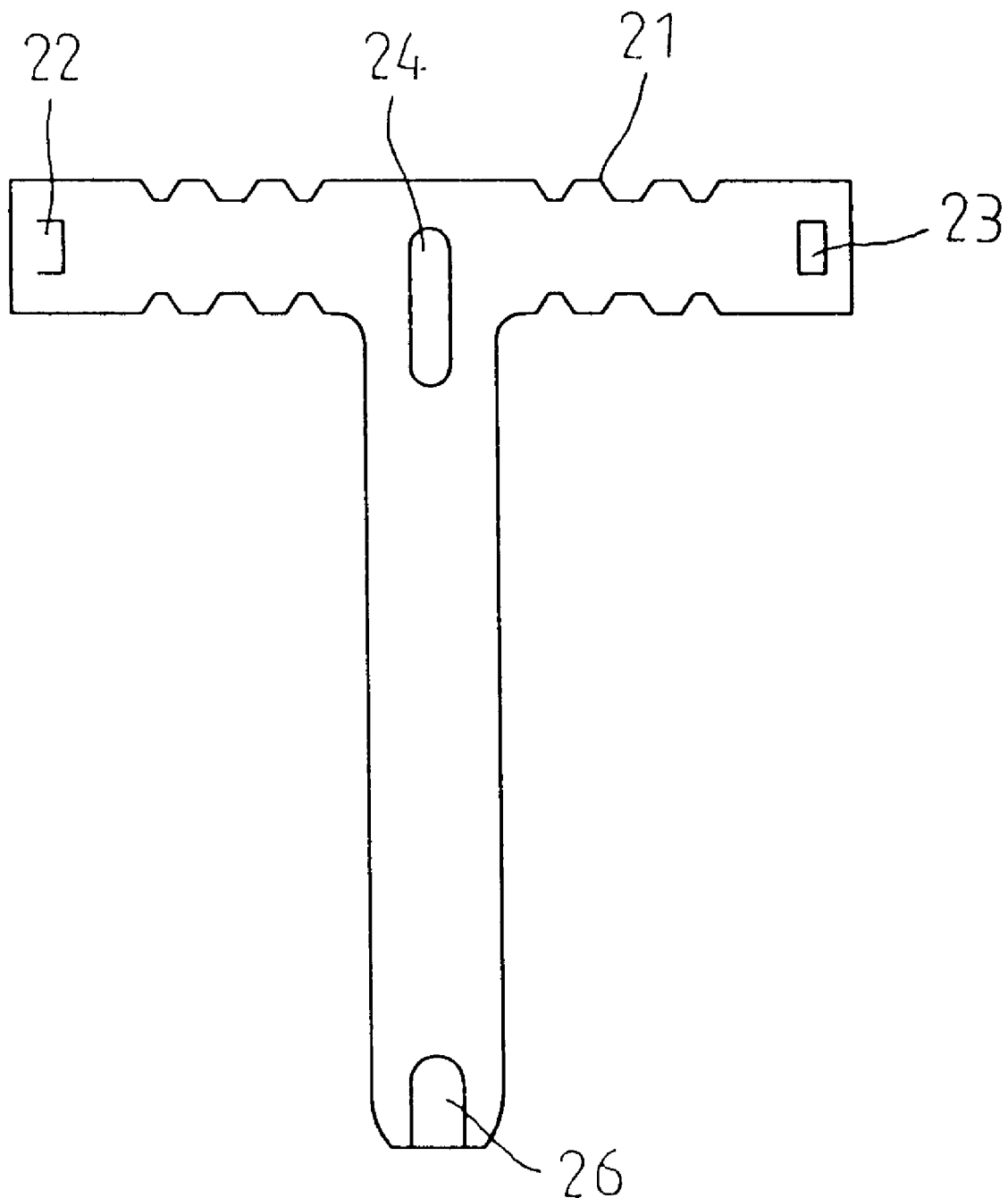
F I G. 3

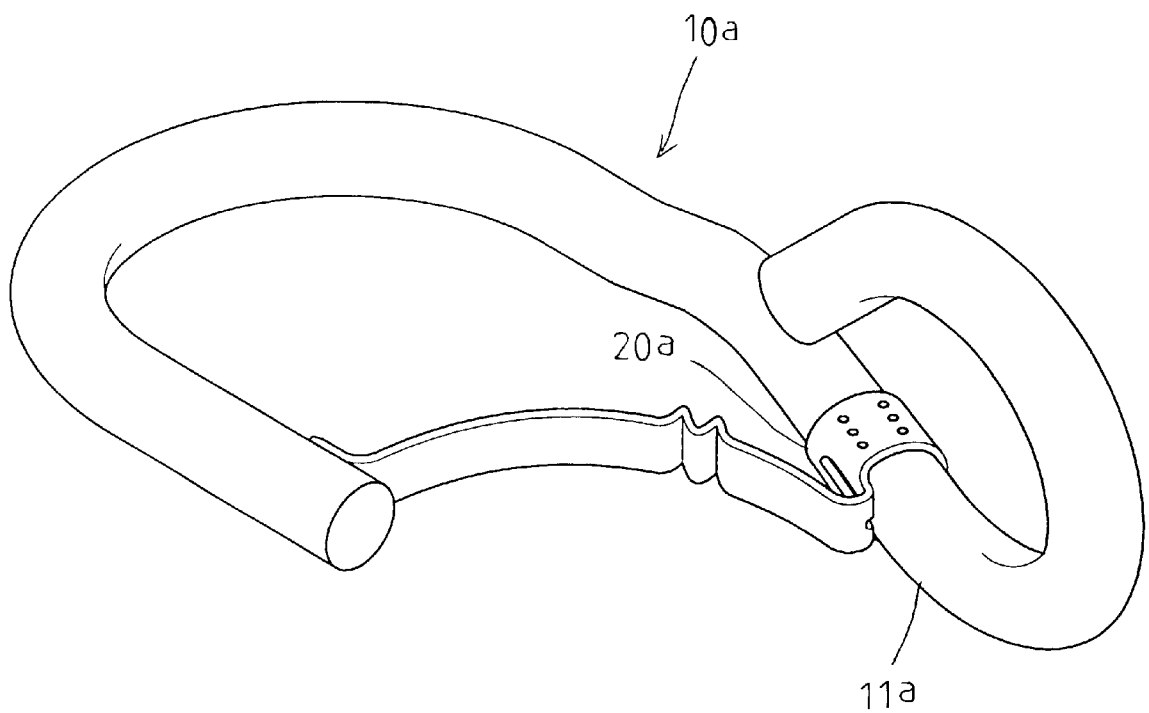
F I G. 5
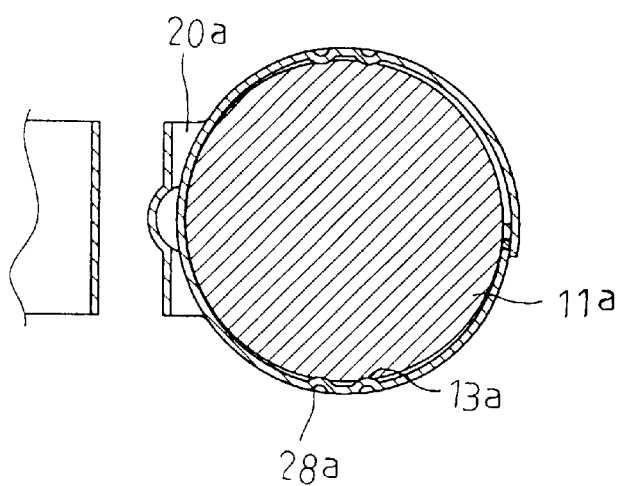
F I G. 5A

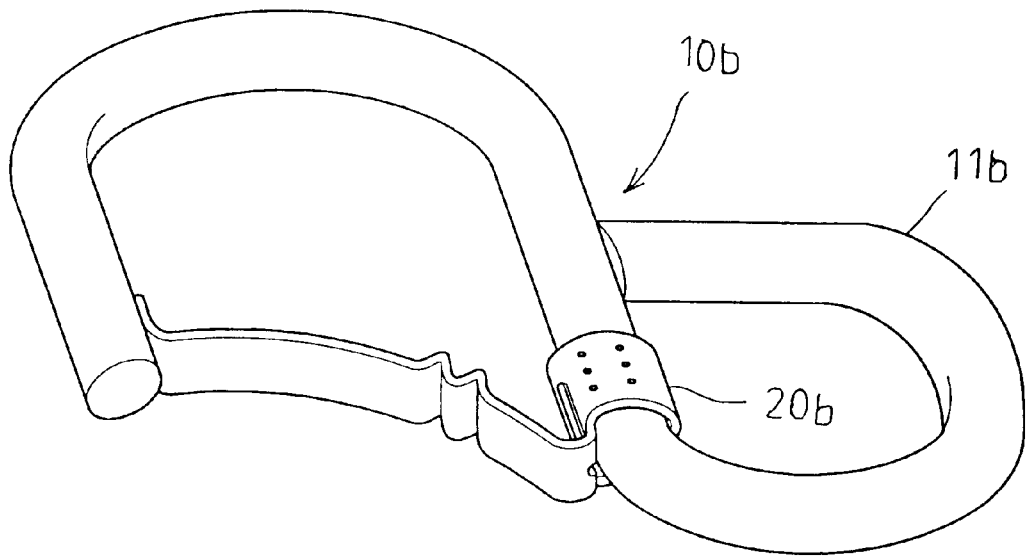
F I G. 6
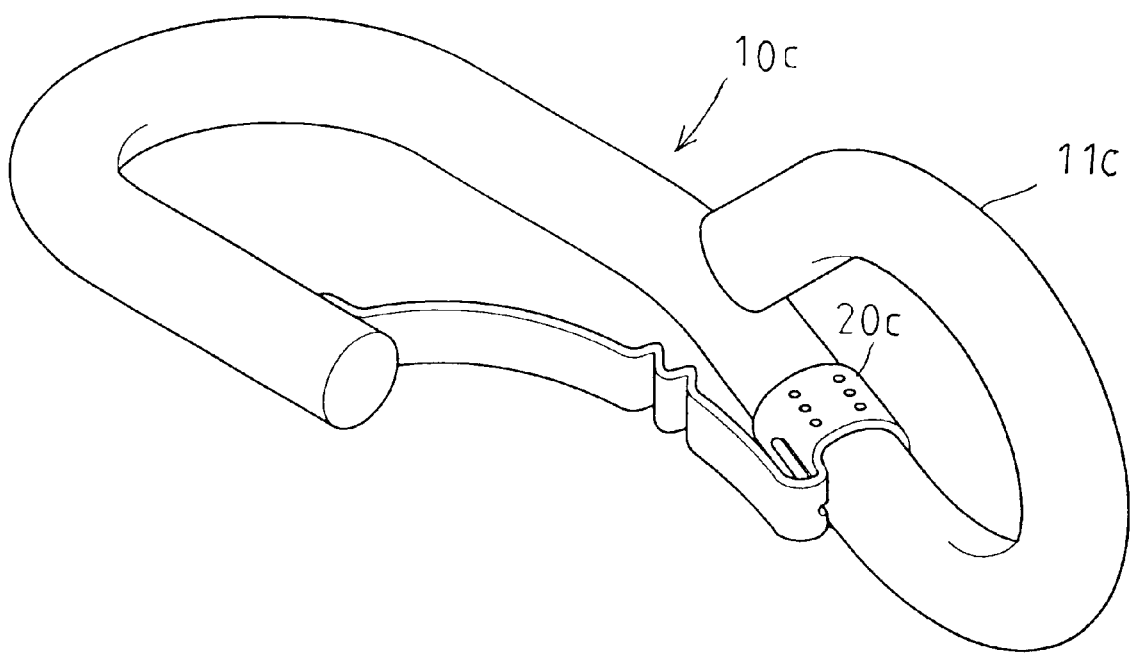
F I G. 7

COUPLING DEVICE

BACKGROUND OF THE INVENTION

The present invention relates to a coupling device. More particularly, the present invention relates to a coupling device which has a safety clamp device.

Referring to FIGS. 1 and 1A, a conventional coupling device 10' has a shackle 11', a hook 12' connected to the shackle 11', a safety clamp plate 20' disposed on the shackle 11', a spring 40' disposed between the shackle 11' and the safety clamp plate 20', and a rivet 30' fastening the safety clamp plate 20', the spring 40', and the shackle 11' together. However, a hole should be formed on the shackle 11' in order to receive the rivet 30'. Therefore, a structure of the shackle 11' is weakened.

SUMMARY OF THE INVENTION

An object of the present invention is to provide a coupling device which has a safety clamp device surrounding a shackle without damaging a structure of the shackle.

Another object of the present invention is to provide a coupling device which has a safety clamp device surrounding a shackle stably.

Accordingly, a coupling device comprises a shackle, a hook connected to the shackle, and a safety clamp device surrounding the shackle. The safety clamp device has a central reinforced rib, a flap bar, a slot, a plurality of clamp teeth, and a flexible plate. The flexible plate has a curved portion and a guide recess. The flap bar is inserted in the slot of the safety clamp device.

BRIEF DESCRIPTION OF THE DRAWINGS

FIG. 2 is a perspective view of a coupling device of a first preferred embodiment in accordance with the present invention;

FIG. 2A is a partially enlarged view of FIG. 2;

FIG. 3 is an elevational view of a semi-product of a safety clamp device of a first preferred embodiment in accordance with the present invention;

FIG. 5 is a perspective view of a coupling device of a second preferred embodiment in accordance with the present invention;

FIG. 5A is a partially sectional view of a coupling device of a second preferred embodiment in accordance with the present invention;

FIG. 6 is a perspective view of a coupling device of a third preferred embodiment in accordance with the present invention; and FIG. 7 is a perspective view of a coupling device of a fourth preferred embodiment in accordance with the present invention.

DETAILED DESCRIPTION OF THE INVENTION

Figure 1:
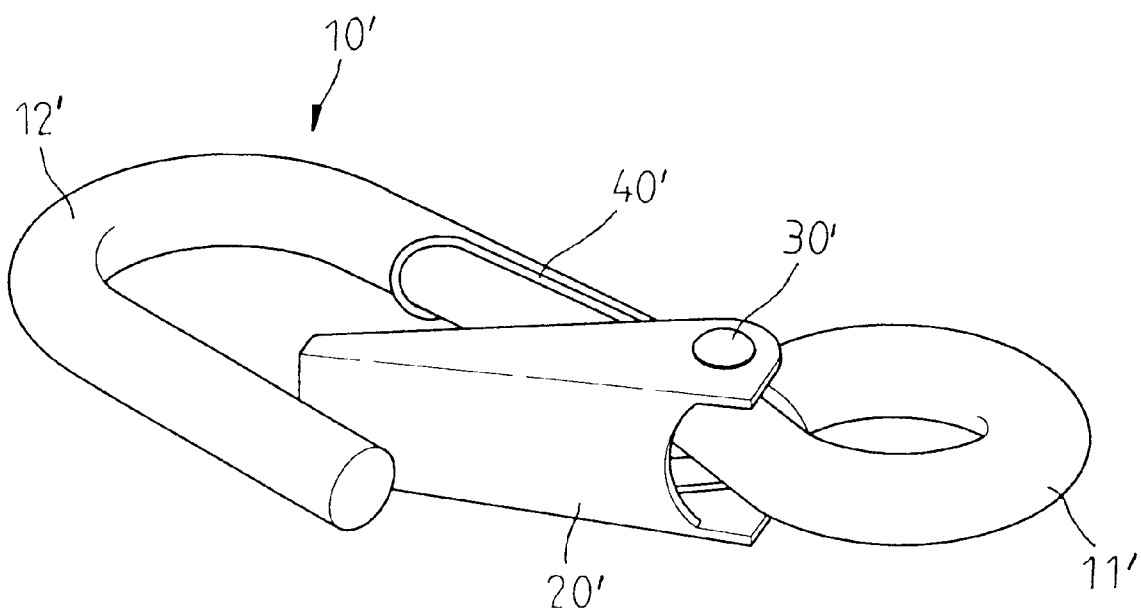
FIG. 1 is a perspective view of a conventional coupling device of the prior art.
Figure 1A:
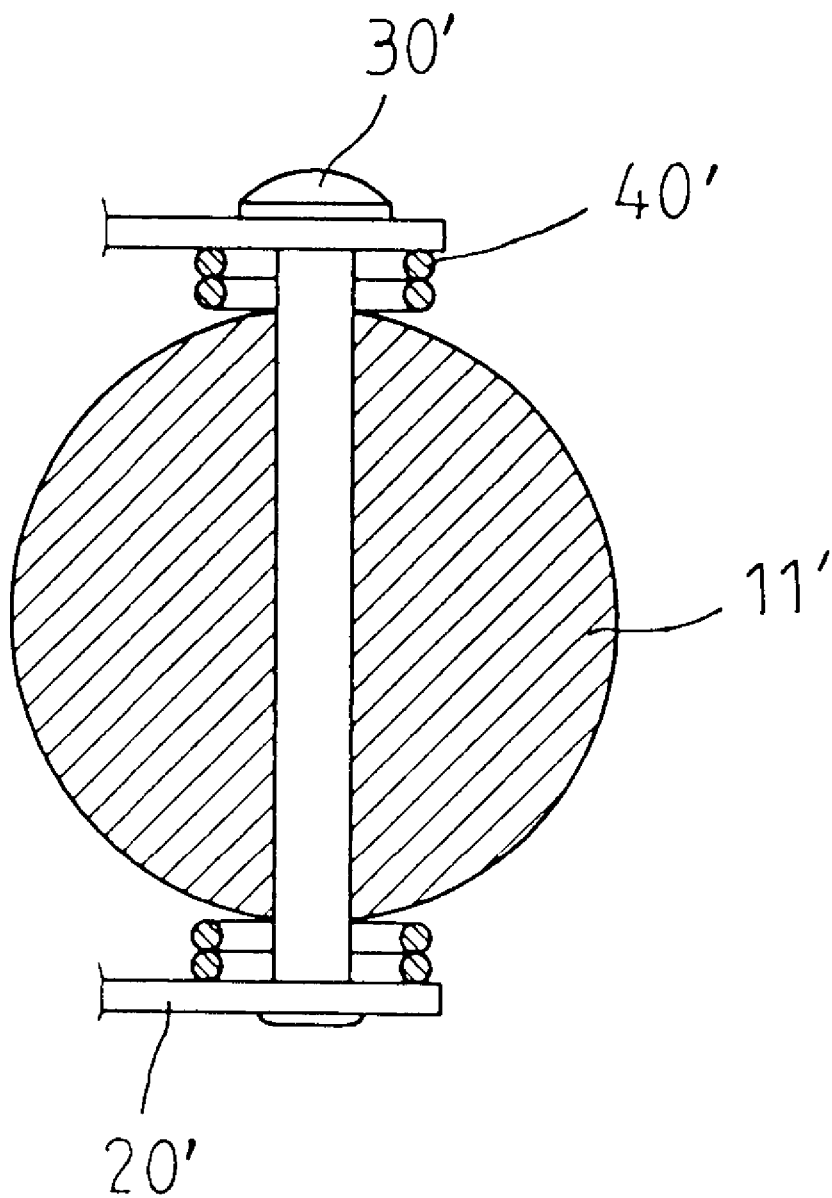
FIG. 1A is a partially sectional view of a conventional coupling device of the prior art.
Figure 2B:
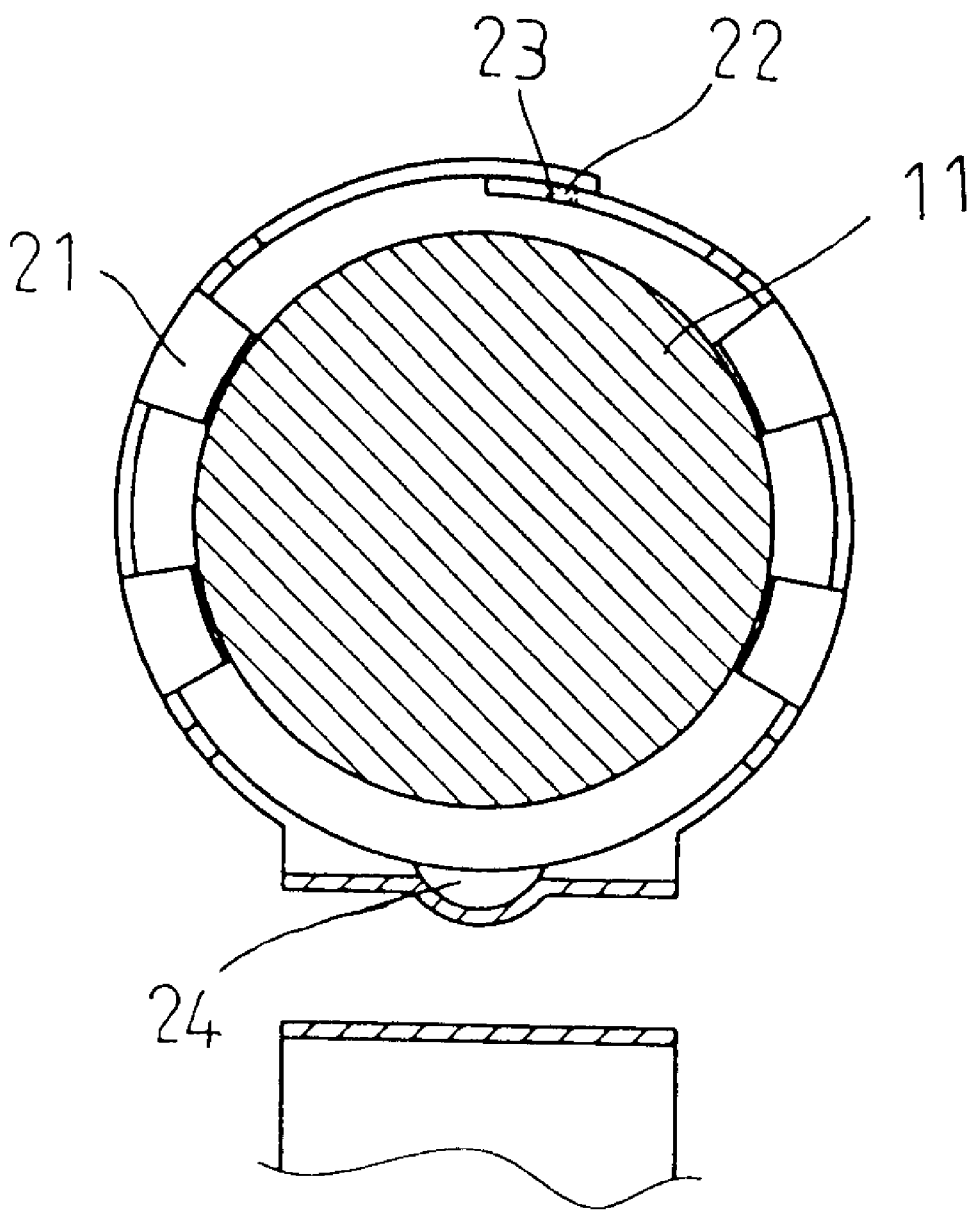
FIG. 2B is a partially sectional view of a coupling device of a first preferred embodiment in accordance with the present invention.
Figure 4:
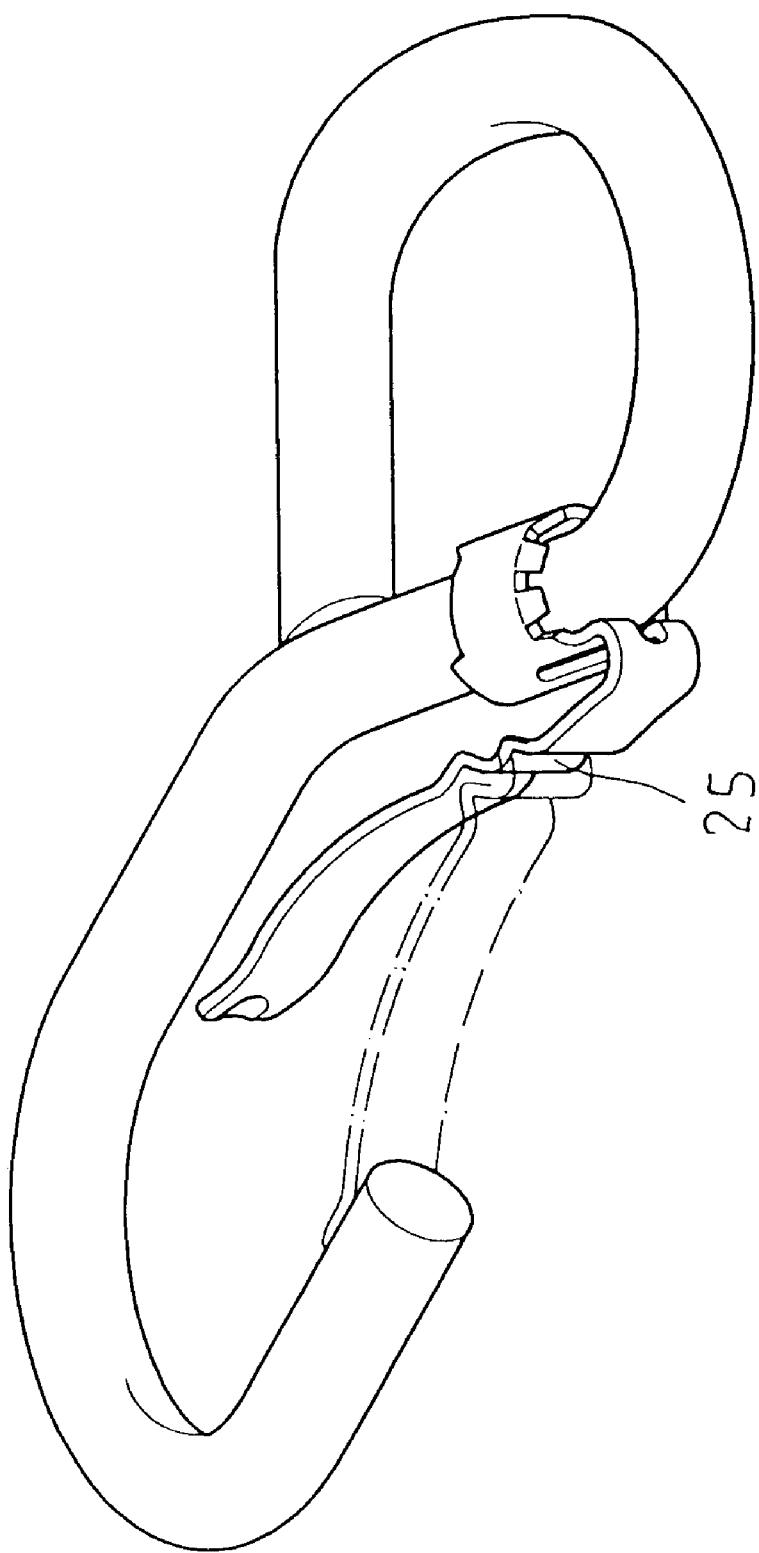
FIG. 4 is a schematic view illustrating an operation of a safety clamp device of a first preferred embodiment in accordance with the present invention.

Referring to FIGS. 2 to 4, a first coupling device 10 comprises a shackle 11, a hook 12 connected to the shackle 11, and a safety clamp device 20 surrounding the shackle 11.

The safety clamp device 20 has a central reinforced rib 24, a flap bar 22, a slot 23, a plurality of clamp teeth 21, and a flexible plate 25.

The flexible plate 25 has a curved portion 27 and a guide recess 26.

The flap bar 22 is inserted in the slot 23 of the safety clamp device 20.

Referring to FIGS. 5 and 5A, a second coupling device 10a comprises a shackle 11a and a safety clamp device 20a surrounding the shackle 11a.

The shackle 11a has a plurality of indentations 13a.

The safety clamp device 20a has a plurality of protruded teeth 28a to engage with the indentations 13a of the shackle 11a.

Referring to FIG. 6, a third coupling device 10b comprises a shackle 11b and a safety clamp device 20b surrounding the shackle 11b.

Referring to FIG. 7, a fourth coupling device 10c comprises a shackle 11c and a safety clamp device 20c surrounding the shackle 11c.

The present invention is not limited to the above embodiments but various modification thereof may be made. Furthermore, various changes in form and detail may be made without departing from the scope of the present invention.

I claim:

1. A coupling device comprises:

a shackle, a hook connected to the shackle, and a safety clamp device surrounding the shackle, the safety clamp device having a central reinforced rib, a flap bar, a slot, a plurality of clamp teeth, and a flexible plate, the flexible plate having a curved portion and a guide recess, and the flap bar inserted in the slot of the safety clamp device.

2. The coupling device as claimed in claim 1, wherein the shackle has a plurality of indentations, and the safety clamp device has a plurality of protruded teeth to engage with the indentations of the shackle.

* * * * *